Figure 1:
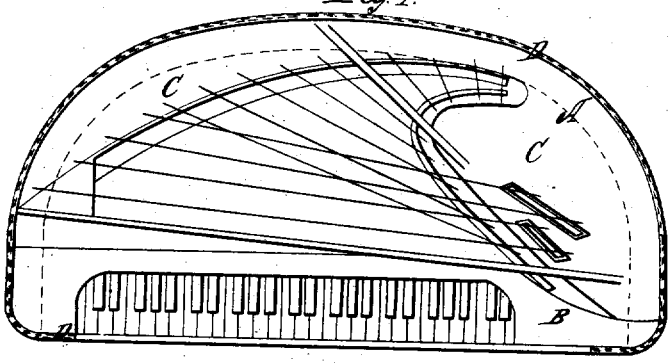
Figure 2:
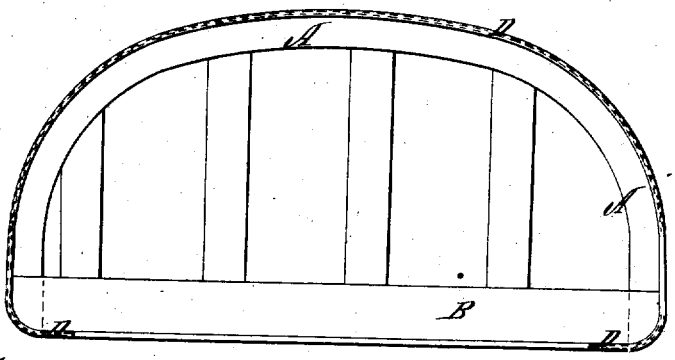

H. Lindeman,

Piano,

No. 1,773. Reissued Sep. 27, 1864

Witnesses:
Henry C. Rowden
Chas. McCarthy

Inventor:
Herman Lindeman

AM. PHOTO-LITHO. CO. N.Y. (OSBORNE'S PROCESS)

UNITED STATES PATENT OFFICE.

HERMAN LINDEMAN, OF NEW YORK, N. Y.

PIANO-FORTE.

Specification forming part of Letters Patent No. 29,502, dated August 7, 1860; Reissue No. 1,773, dated September 27, 1864.

*To all whom it may concern:*

Be it known that I, HERMAN LINDEMAN, of New York, in the county and State of New York, have invented new and useful Improvements in Piano-Fortes; and I hereby declare that the following is a full and exact description of the same, reference being had to the accompanying drawings, and to the letters of reference marked thereon.

Figure I represents a top view, and Fig. II a bottom view, of my improved piano.

The nature of my invention consists in constructing the long and cross blocks of a piano-forte, as well as the outside casing of a regular arched or cycloid curved structure, which may be made of wood or any other material of the required strength, and whereby the instrument can be made lighter, smaller, and circular at the back and sides.

In the accompanying drawings, A represents the curved or arched structure, which becomes a substitute for the long and cross blocks. The same is made of a number of thin boards or veneers, being bent round a form of the required curve and glued to each other, and then tied together near the front by the brace B in such a manner that the two sides and the back shall form a regular and continued curve. Instead of forming the sides and back in one piece and tying the front ends together by a brace, this structure may be continued round the front part, and then cut out in the front for the key-board. Outside of the structure A the covering or casing D, constructed in a similar manner of thin boards or veneers, is fastened, giving thereby a circular appearance to the instrument at the back and at the sides.

To facilitate the attachment of the hinges for the top cover of the piano-forte the back may be made in the center for a short distance straight, or nearly straight, while both sides form regular and continued curves.

Upon this structure, A or substitute for the long and cross blocks, the turning block is fastened, covered by the iron or metal plate C, and constructed in the usual manner, except that the outer shape corresponds with the shape of the structure A.

By this curved structure of the substitute for the long and cross blocks and of the outside casing, as well as by the manner of constructing the same of thin boards or veneers glued together, the immense strain of the strings is more easily resisted, while at the same time pianos can be made much smaller and lighter, as the long and cross blocks now in use are for the purpose of obtaining the required strength to withstand this immense strain, of necessity placed in such position as to occupy space, which this improvement dispenses with.

This arched or curved structure A may likewise be placed in a square piano, or in a piano-case having straight sides with rounded corners, as well as in an upright or boudoir piano.

What I claim as my invention, and desire to secure by Letters Patent, is—

1. The arrangement and construction of a curved or arched structure, as a substitute for the long and cross blocks now in use, in the manner and for the purpose substantially as described.

2. An arched or curved structure as a substitute for the long and cross blocks, as well as the outside casing made of a number of veneers or boards glued together in the manner and for the purpose substantially as set forth and specified.

Witnesses: HERMAN LINDEMAN.
HENRY E. RADER,
CHAS. T. MCCARTHY.